United States Patent [19]

Suda

[11] Patent Number: 5,678,097

[45] Date of Patent: Oct. 14, 1997

[54] FOCUS DETECTING DEVICE

[75] Inventor: Yasuo Suda, Yokohama, Japan

[73] Assignee: Canon Kabushiki Kaisha, Tokyo, Japan

[21] Appl. No.: 151,779

[22] Filed: Nov. 15, 1993

Related U.S. Application Data

[63] Continuation of Ser. No. 723,962, Jul. 1, 1991, abandoned.

[30] Foreign Application Priority Data

Jul. 6, 1990 [JP] Japan .................. 2-178848

[51] Int. Cl.$^6$ .................. G03B 3/00; G03B 13/18
[52] U.S. Cl. .................. 396/113; 396/114
[58] Field of Search .................. 354/406, 407, 354/408, 403, 200, 201

[56] References Cited

U.S. PATENT DOCUMENTS

| 3,529,527 | 9/1970 | Leitz | 95/44 |
|---|---|---|---|
| 3,529,528 | 9/1970 | Leitz | 95/44 |
| 4,071,297 | 1/1978 | Leitz | 356/4 |
| 4,563,068 | 1/1986 | Kimura et al. | 354/402 |
| 4,670,645 | 6/1987 | Ohtaka et al. | 250/201 |
| 4,818,865 | 4/1989 | Matsui et al. | 354/340 X |
| 4,916,473 | 4/1990 | Mukai et al. | 354/406 X |
| 4,963,912 | 10/1990 | Suda et al. | 354/404 |
| 4,982,214 | 1/1991 | Matsui | 354/200 |
| 5,004,902 | 4/1991 | Matsui et al. | 354/406 X |
| 5,089,835 | 2/1992 | Kitagishi | 354/200 |

FOREIGN PATENT DOCUMENTS

| 58-142306 | 8/1983 | Japan . |
|---|---|---|
| 59-107311 | 6/1984 | Japan . |
| 59-107313 | 6/1984 | Japan . |
| 59-208514 | 11/1984 | Japan . |
| 60-68310 | 4/1985 | Japan . |
| 60-101513 | 6/1985 | Japan . |
| 61-73119 | 4/1986 | Japan . |
| 61-160824 | 6/1986 | Japan . |
| 63-88511 | 4/1988 | Japan . |
| 594189 | 8/1977 | Switzerland . |

OTHER PUBLICATIONS

Japanese Patent Abstract No. 58086506, N. Yasuo, Aug. 13, 1983.

*Primary Examiner*—Howard B. Blankenship
*Assistant Examiner*—Jae N. Noh
*Attorney, Agent, or Firm*—Fitzpatrick, Cella, Harper & Scinto

[57] ABSTRACT

A focus detecting device having a light distribution forming device for forming the light intensity distribution whose relative position varies in accordance with the focus adjustment of an object lens from the light flux passing through the object lens, a sensing device for receiving the light intensity distribution and outputting a signal representing the state of focus adjustment of the object lens based on the relative position in the light intensity distribution, and having a plurality of sensing elements, and a light diffusing device disposed in or near a predetermined imaging plane of the object lens, and having the degree of light diffusion determined so that the light intensity distribution can be moved relatively in accordance with the adjustment of the object lens.

7 Claims, 11 Drawing Sheets

FOCUS DETECTING DEVICE

This application is a continuation of application Ser. No. 07/723,962 filed Jul. 1, 1991, now abandoned.

BACKGROUND OF INVENTION

1. Field of Invention

The present invention relates to a focus detecting device appropriately used for a still camera or a video camera, and more particularly to a focus detecting device in which two object images are further formed from an object image formed on a predetermined imaging plane using the light flux passing through an object lens, and the focusing state of the object lens is detected by obtaining the relative positional relation between these two object images.

2. Related Background Art

Conventionally, in the focus detecting method of the light receiving type using the light flux passing through an object lens, a so-called image correlation method is known.

This image correlation method is constituted by arranging a field lens in the neighborhood of a predetermined imaging plane on which an object image is formed by the object lens, a secondary optical system having a porous mask and one or two secondary lenses behind the field lens, and further behind it, light receiving means having an array of a plurality of light receiving elements, as proposed for example in Japanese Laid-Open Patent Application No. 59-107311.

Using the field lens and the secondary optical system, two object images are formed on a plane of the array of light receiving elements from the object image formed on the predetermined imaging plane, respectively, using the light flux passing through two different regions in a pupil of the object lens. The relative positional relation between two object images formed on the plane of the array of light receiving elements depends on the focusing state of the object lens. For example, it appears as the amount of lateral shift corresponding to of the object lens in a direction of arranging the the out-of-focus amount from the predetermined imaging plane elements on the array of light receiving elements.

The focusing state of the object lens, i.e., the out-of-focus amount, is determined by detecting the relative positional relation of two object images at this time, i.e., the amount of lateral shift, with the light receiving means.

The focus detecting device in this image correlation method has the feature of being able to detect a relatively large out-of-focus amount, or allowing a relatively excellent focus detection in the photography from wide-angle to telephoto.

FIG. 3 in U.S. Pat. No. 3,529,528 shows the focus detection carried out through a ground glass. It was considered that the light flux passing through the ground glass having a sufficient diffusibility would have a pair of fixed distributions for a quantity of light on a sensor, because the ground glass itself could fulfill the same optical effects as those of an object. However, referring to U.S. Pat. No. 3,529,527, it will be understood that difficulties were dissolved by providing a special region directly transmitting the light on the ground glass. Also, in Japanese Laid-Open Patent Application No. 60-68310, the focus detection is performed using the light passing through a focusing screen, in which a light transmission portion is specially provided in a central area of the focusing screen. However, such region is likely to interfere with the photographer's view of the object.

On the other hand, apart from the focusing detection result with the two-image correlation method, a technique for adjusting the focus in view of the spherical aberration of a taking lens is disclosed in Japanese Laid-Open Patent Application No. 59-208514.

Generally, the best imaging plane of the taking lens and an imaging plane position which the focus detecting device outputs do not coincide. This is due to the spherical aberration of the taking lens, in which when an iris value of the light flux used for the focus detection and that in photographing are different, a difference will occur between the focusing positions. That is, it is due to the same reason that the optimal lens feeding positions are different between the photographing in full aperature and that in a stop-down state.

In the above publication, the focusing control is performed so as to obtain the best object image on a film surface by adding an error between the best imaging plane position and the film surface based on the spherical aberration intrinsic to the taking lens to the focus detection information obtained by focus detecting means.

Also, in Japanese Laid-Open Patent Application No. 61-73119, there is disclosed a technique for making the correct focusing in such a way as to minimize the difference between best imaging plane position and focusing position with the focus detecting device by making closer the light flux for photometry and that for photography.

Next, disadvantages of the above conventional examples are described. Firstly, in general, the best imaging plane position of the taking lens is changed by the spatial frequency of the object. Accordingly, it is not mentioned that the optimal focusing position can be necessarily obtained to a sufficient degree, with a usual correction method based on the focus detecting device and the spherical aberration of the taking lens as described in Japanese Laid-Open Patent Application No. 59-208514. For example, if the correction for imaging plane with this method is set for a spatial frequency of 30 lines/mm on the imaging plane, the focusing is not necessarily achieved for an object of 10 lines/mm.

As the background for this, the relation between the spatial frequency and the best imaging plane will be described. FIG. 17 is an aberration view representing the ray of light and the spherical aberration near the imaging plane, together with the states of point image (as transferred from "Modern camera and lens technology" by Iwao Ogura, Photo Industrial Publishing Company, p. 160). Provided that the full aperture is a lens of F 1.4, the maximum incident height is divided into 10 divisions, which are numbered 0 to 10. These numbers correspond to the numbers on the aberation view and the numbers on the optical axis, which positions are points where the ray of light passing through a portion of a radius of $h_0$ on an exit pupil transverses the optical axis. In a taking lens having such characteristics, when the imaging plane is set at positions as indicated by a-h in the figure, the point image is changed as shown in the figure. It should be noted that the intensity distribution of point image can be obtained by integrating the density of ray of light appearing on cross-section. First, at the position a, unfocused paraxial image remains in the central portion of light spot spread like a circular disk, but with a substantially uniform broadening of light. The position b is a point of paraxial image, yielding an apparent bright spot in the central portion, and having significant large halo around its periphery. After the state at the position c, the ray of light is converged in the most minimum range at the position d, forming a so-called circle of least confusion. This circle of least confusion contributes to the formation of image as a whole, giving a relatively high contrast to the image having a relatively low frequency. At the position e, the circle of confusion for only bright spot except for halo is minimum. Comparing this minimum core with the circle of least confusion at the position d, the minimum core is considerably smaller, and at this position, the so-called resolving power signifying a resolution limit frequency indicates a high value. However, owing to the halo broadening on the periphery, the low contrast is caused at image of low frequency. From positions f to h, the light spots broaden, and the bright spots in the central portions are inconspicuous to become annular shape and disappear gradually.

With the above variation of point image, it will be understood that the defocus characteristics for MTF (Modulation Transfer Function) are different depending on the spatial frequency of image. FIGS. 18 and 19 are examples showing MTF when the spatial frequencies are 50 lines/mm and 20 lines/mm, respectively. In the figure, the horizontal axis is the position of an imaging plane, with a paraxial image point being taken as an origin. In a spatial frequency of 50 lines, there is a peak at a position of imaging plane −0.1 [mm], while in 20 lines/mm, there is a peak at −0.06 [mm]. In this way, the position of best imaging plane is different depending on the spatial frequency, and it corresponds to the position of minimum core for the image at high frequency, or the position of circle of least confusion for the image at relative low frequency. Here, the high or low criterion of the spatial frequency is relied on the comparison between the wavelength and the circle of least confusion.

Japanese Laid-Open Patent Application No. 61-73119, which provides one measure for detecting correctly the position of best imaging plane varied depending on the spatial frequency as above described, discloses the operation of an example in which the light flux taken in by the focus detecting device and the light flux for photographing are set to be almost equal. For example, FIG. 20 shows an example of the focus detecting device in such a method. In this figure, 20 is an object plane, 21 is a taking lens in a single lens reflex camera, not shown, 23 is a field lens provided in the neighborhood of a predetermined imaging plane (focal plane in the camera) 22 of the taking lens 21, 24, 25 are secondary imaging lenses arranged symmetrically around an optical axis L1 of the taking lens 21 for forming two object images based on the light fluxes passing through respective regions 31a, 31b having different exit pupils of the taking lens 21, and 26, 27 are arrays of photoelectric transfer elements for detecting object images formed by the secondary imaging lenses 24, 25, respectively, these arrays of elements 26, 27 being composed of CCD's (Charge Coupled Devices), for example. Mask 28 is provided in the neighborhood of the secondary imaging lenses, the field lens 23 forming images of opening portions 28a, 28b of the mask 28 on to different exit pupil areas 31a, 31b of the taking lens 21. In this example, most portions of the exit pupils of the taking lens are occupied by the above areas 31a, 31b, so that the light flux for range finding and that for photographing at the full aperture are approximately equal, whereby it is possible to detect the optimal focusing position in accordance with the spatial frequency of the object image. Next, using a taking lens shown in FIG. 17 as an example for the lens having the general aberration characteristics, the above point will be described. FIG. 21 represents the object image produced by the combination of a point image and an object, in which FIGS. 21(a) and (b) show the intensity distribution of the point image at the positions e and d as shown in FIG. 17, respectively.

In FIG. 21, 120 and 123 are the intensity distributions due to the ray of light from the total incident height of pupil, 121 and 124 are the intensity distributions due to the ray of light passing through a portion over the optical axis of pupil, and 122 and 125 are the intensity distributions due to the ray of light passing through a portion under the optical axis of pupil. Accordingly, for example, the sum of the intensity distributions 121 and 122 is the intensity distribution 120 itself. In this way, considering the forming state of image by dividing the pupil, it is equivalent to the movement of the image on photoelectric transfer elements in the focus detecting device of image shift method which is transformed onto a primary imaging plane. The point image as shown in FIG. 21(a) consists of a high peak in the central portion, and halo surrounding it. Considering this for each area of the pupil, it will be understood that the central peak is the sum of two intensity distributions 121 and 122, and the peripheral halo is formed of pupil on one side only. This is because as the ray of light not contributing to the formation of the core of the point image intersects the optical axis at a position more remote from the lens than at the position e as shown in FIG. 17, the halo when the pupil is halved will appear mainly on one side of the peak. On the contrary, the point image as shown in FIG. 21(b) is a trapezoidal distribution, and considering for each area of pupil, the whole of point image is the sum of two intensity distributions 124 and 125. That is, the ray of light which is a halo at the position e is collected near the optical axis, and a part of the ray of light forming the core moves to the opposite side to the halo. Generally, the object image can be obtained by convoluing the intensity of such point image with the luminance distribution of the object, whereby the ratio of contrast of the image to that of the object, and the phase shift between object and image are different depending on the spatial frequency of the object. FIGS. 21(e) to (h) show the behavior of object image when the object is selected as in FIG. 21(c) or (d), for explaining the change of image owinig to the difference of point image. The broken and solid lines show respective images with divided pupil areas.

First, the object at high frequency as shown in FIG. 21(c) will be described. The luminance distribution 126 of object is projected as object images 127 and 128 by the convolution of point image with the intensity distributions 121 and 122. At this time, though the intensity distributions 121 and 122 have opposite directions of drawing tails, with not the same shapes, the images are substantially in phase because of the object at high frequency. Also, as previously described, the intensity of point image has a shape giving the peak of resolution, so that the image of object at high frequency has a relatively high contrast. On the other hand, the object image obtained by convolution with the point image as shown in FIG. 21(b) has a significantly lower contrast, as shown in FIG. 21(g), leaving only slight light and shade due to spurious resolution. In practice, the focus detection becomes difficult in such contrast.

On the contrary, an object 129 at relative low frequency as shown in FIG. 21(d) can be resolved with a contrast sufficient for the focus detection, whether the point image is either as shown in FIG. 21(a) or (b). However, with the point image as shown in FIG. 21(a), two images 130 and 131 as shown by broken and solid lines are not in phase under the influence of halo spreading on one side of peak, and with the point image as shown in FIG. 21(b) without halo, they become in phase, as well as having high contrast, as shown in FIG. 21(h).

Considering the change of object image as above described applied to the operation of focus detecting device, and provided that the focus detecting device judges the focusing when the two image pupils divided coincide, the focus position of FIG. 21(a) for the object as shown in FIG. 21(c), and that of FIG. 21(b) for the object as shown in FIG. 21(d) are focusing positions output by the focus detecting device, respectively. This is coincident with the focus position where the contrast of object image is maximum. In this way, by making coincident the light flux for photographing and that for range finding, and detecting the phase of object image including the halo due to spherical aberration, the optimal focus position of the taking lens in view of the spatial frequency of object image can be found.

It should be noted that the reason why the optimal focus is obtained at the full aperture with the light flux for range finding made coincident with that for photographing in the state of full aperture of the taking lens is that the out-of-focus condition is most conspicuous when the depth of imaging plane is shallowest.

The operation of focus detection in the device as shown in FIG. 20 is as follows.

For example, if the taking lens 21 is fed to the left, as shown, to be placed into a so-called front focusing state, the object images at object plane positions formed on the respective light receiving planes of the arrays of photoelectric transfer elements 26, 27 by the secondary imaging lenses 24, 25 are shifted in the directions as indicated in the figure, respectively, so that the state of front focusing and its amount can be detected by the variations of outputs from the arrays of photoelectric transfer elements 26, 27 in accordance with the relative shifts of images. Also, in the back focusing state, respective images are shifted in the directions opposite to those of the front focusing state, so that the back focusing state and its amount can be detected.

By the way, the range of out-of-focus conditions that can be detected with the above focus detecting device can be determined by the amount of shift in the secondary image of object for the out-of-focus condition and the length of the array of photoelectric transfer elements which catch the object image. When the light flux for range finding is set to be the maximum of exit pupil, as in this focus detecting device, the base length for range finding is longer, and the amount of shift in the secondary image for the out-of-focus condition is greater, so that the array of photoelectric transfer elements required is a significantly long one. The relation between the base length of range finding and the amount of image shift is detailed in Japanese Laid-Open Patent Application No. 63-88511. In general, a semiconductor device such as CCD has rapidly decreasing manufacturing yield, along with the increase of its chip size, so that there is a disadvantage that such a sensor of large size becomes quite expensive. Also, it is not preferable from the aspect of storage space of parts, a reimaging lens has the necessity of covering a wide angle of view, so that the difficulty is increased in optical design. As a result, it is necessary to lengthen the optical path of a reimaging system, or distribute the power of reimaging lens to a plurality of lenses, but both cases exert a negative influence on cost and space.

SUMMARY OF INVENTION

An object of the present invention is to allow the detection of the best imaging position of an object lens in accordance with the spatial frequency of an object image.

Another object of the present invention is to make shorter the length of the array of photoelectric transfer elements for receiving the light quantity distributions by reducing the amount of variations in the relative positions in both light quantity distributions owing to the of the unfocused position of object lens, as well as enlarging the passage area of detected light flux at the exit pupil position of the object lens.

Another object of the present invention is to provide a focus detecting device for detecting the focusing state of an object lens with the relative positional relation between a plurality of light quantity distributions formed from the light flux passing through the object lens, wherein light quantity distribution forming means is arranged to receive the object light through light diffusing means disposed in the neighborhood of a predetermined imaging plane of the object lens.

It should be noted that a diffuser plate in the present invention is positioned on or near a predetermined imaging plane of a taking lens, and has a different action from that of an optical low pass filter which has been conventionally proposed in various forms. The optical low pass filter can exhibit its effects by being located away from the predetermined imaging plane. Of course, this diffuser plate may not have such a strong diffusibility that the light quantity distribution may not experience the relative movement even if the focus adjustment condition of object lens is changed.

DETAILED DESCRIPTION OF THE PREFERRED EMBODIMENTS

Figure 1:
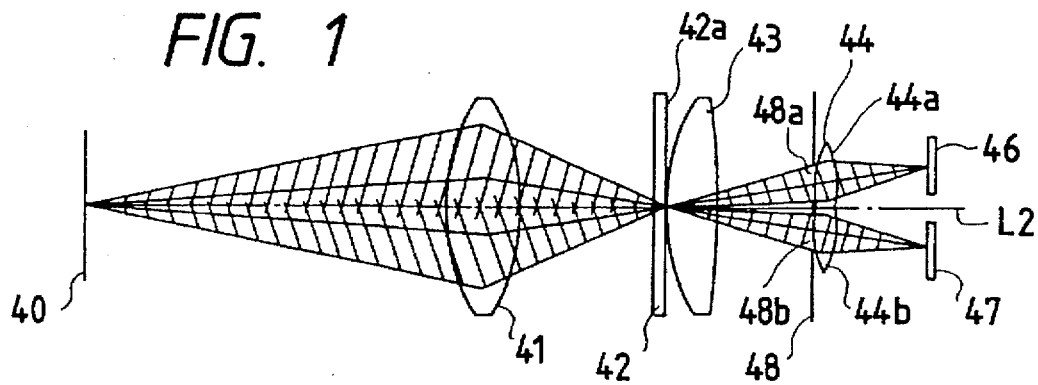
FIG. 1 is a cross-sectional view of a focus detecting device in an example of the present invention.

FIGS. 1 to 4 are concerned with a first example according to the present invention. In FIG. 1, 40 is an object plane, 41 is a taking lens, 42 is a diffuser plate on which a mat plane 42a consisting of minute irregularities is disposed near a predetermined imaging plane of the taking lens, 43 is a field lens, and 48 is a mask having two opening portions 48a, 48b. Secondary imaging lens 44 has two lens portions 44a, 44b arranged symmetrically around an optical axis L2 of the taking lens. This secondary imaging lens serves to converge the light flux passing through two mask openings 48a, 48b and form a secondary image of object on the arrays of photoelectric transfer elements 46, 47 arranged behind therefrom. The photoelectric transfer output obtained here is input into a microcomputer as will be described later, and used for the focus detection of the taking lens.

Figure 2:
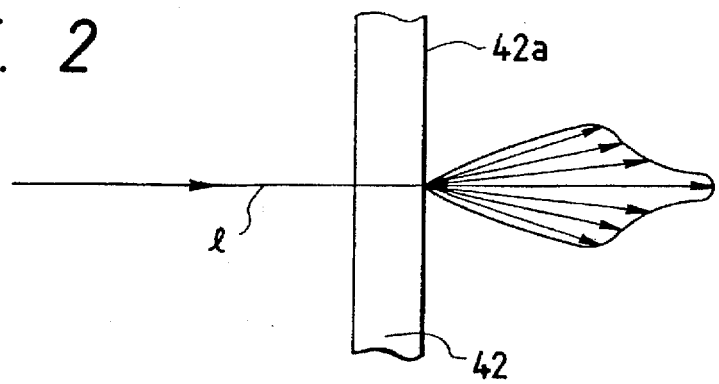
FIG. 2 is an explanation view representing the characteristics of diffusion for a diffuser plate for use with the focus detecting device as shown in FIG. 1.

The field lens 43 as above described has the action of projecting the mask 48 and the exit pupil of taking lens conjugately if the diffuser plate 42 has no diffusing action, in which the passage area of the light flux for range finding on the exit pupil of taking lens can be determined by the diffusion characteristics of the diffuser plate and the converging characteristics of the field lens. FIG. 2 is a view showing the diffusion characteristics of the diffuser plate 42, which illustrates how the ray of light 1 incident thereupon at right angle from the taking lens is diffused at the mat plane 42a on the secondary imaging lens, and owing to such a characteristic that the rectilinear propagation component emerging therefrom at the same angle as that of incidence is strongest, with weaker components appearing if leaving farther away therefrom, it is to be understood that the ray of light incident from the taking lens has some dispersion on the mask 48. Accordingly, on a principle of reversibility of light rays, it follows that the light flux converging at a certain point on the mask 48 has a certain dispersion on the exit pupil in a conjugate relation if there is no diffusion.

Figure 3:
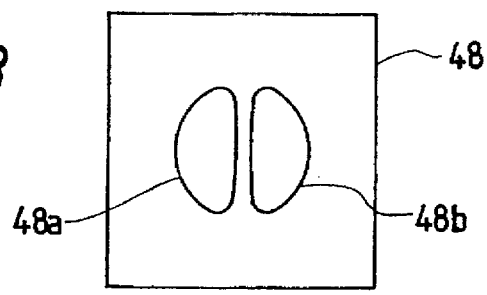
FIG. 3 is a plan view of a mask.
Figure 4:
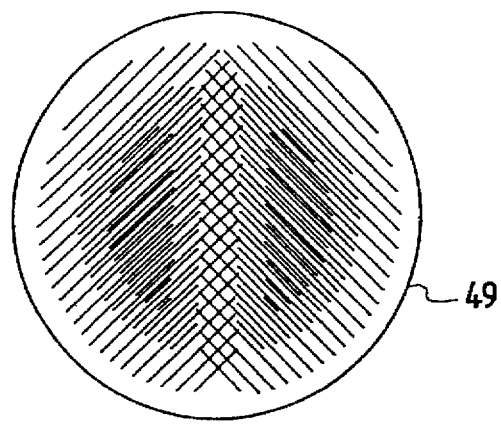
FIG. 4 is an explanation view representing the state of a mask image on an exit pupil of a taking lens.

FIGS. 3 and 4 are explanation views, in which FIG. 3 is a plan view of the mask 48, and FIG. 4 is a view showing an image of mask on the exit pupil of taking lens. First, as shown in FIG. 3, two mask openings 48a, 48b are shaped with one circle divided in half. Their images are formed on the exit pupil by the field lens 43, but images of rectilinear propagation component have some bleeding due to the action of the diffuser plate 42. FIG. 4 shows this state briefly, in which two opening images are represented by right upper slanting lines and left upper slanting lines. These images are overlapped partly, having a shape extending totally inside of the exit pupil as a whole. As a result, it is possible to take in the light flux for range finding from a wide area of exit pupil, while the interval between gravitational centers of mask opening images is relatively small.

Figure 5A:
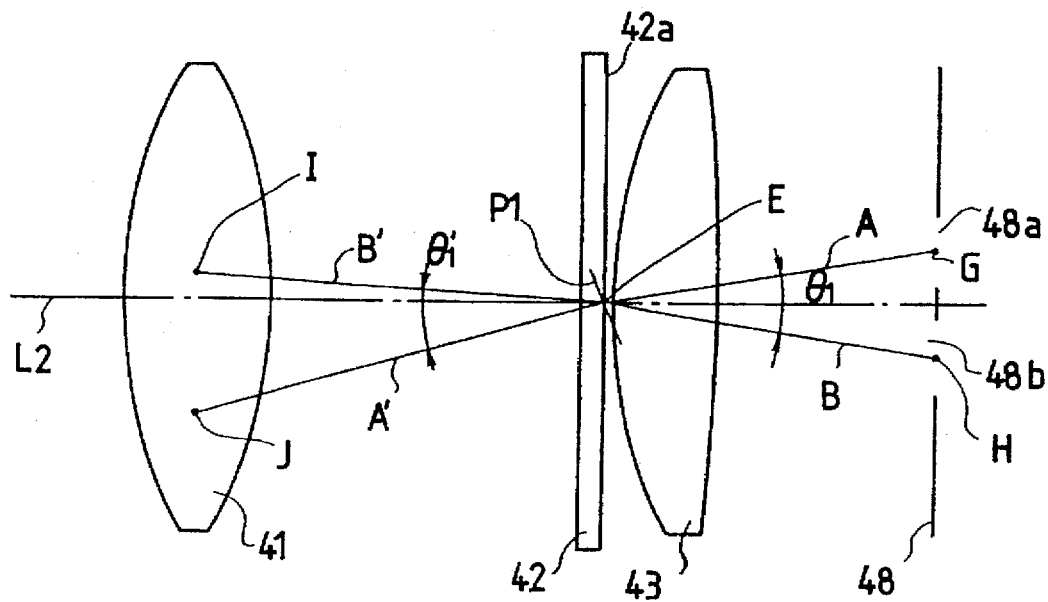
FIGS. 5A and 5B are views for explaining the base length for range finding in the focus detecting device.
Figure 5B:
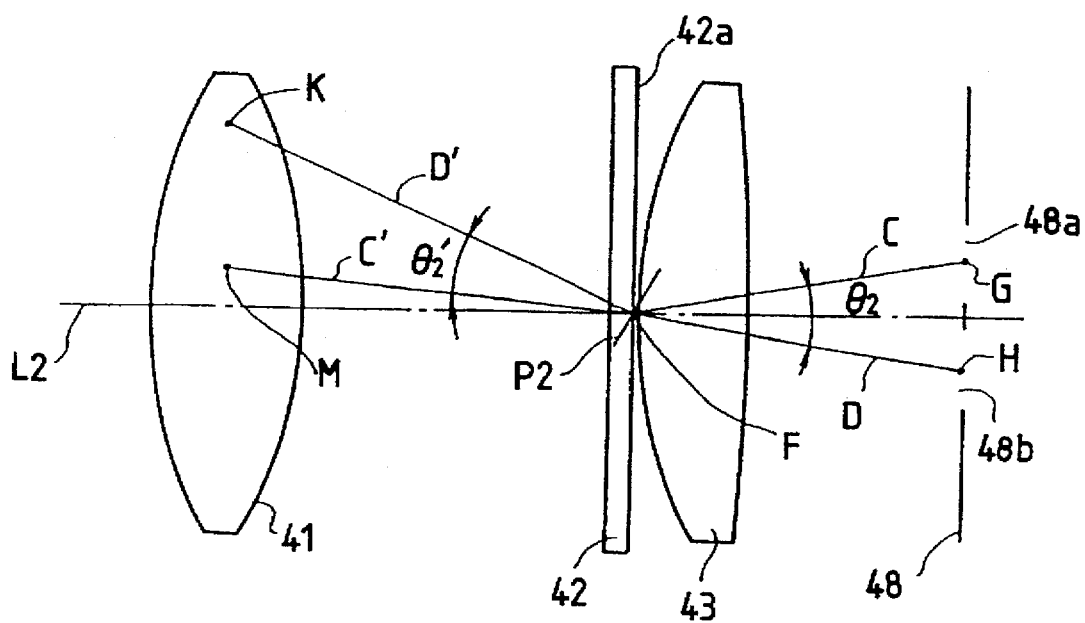

Next, the principle of range finding on the focus detecting device with the above constitution will be described. FIGS. 5A and 5B are explanation views, showing the details from the taking lens 41 to the mask 48. The diffusion of light on the mat plane 42a of diffuser plate 42 requires the analysis on the wave optics strictly, but in this case, the explanation on the geometrical optics will be given. First, in FIG. 5A, two light rays A, B passing through points G, H within the mask openings 48a, 48b and a point E on the optical axis of diffuser plate 42 are considered. The field lens has a thin wall and is adjacent on the mat plane 42a, having an angle $\theta_1$ subtended from the point E to points G, H on the mask opening. The mat plane 42a is an aggregate of continuous, minute irregularities, and if the tangential plane to a curved surface at the point E is a plane as indicated by P1 in the figure, the light rays A, B are refracted at that plane to become the light rays A', B'. In the same way, in FIG. 5B, if a point F is set on the mat plane 42a slightly away from the point E, and the tangential plane at the point F is a plane P2, the light rays C, D are refracted at that plane to become light rays C', D'. Neglecting the thickness of the diffuser plate 42, and assuming the angles $\theta_1$, $\theta_2$, subtended by the arriving points I, J and K, M on the exit pupil at the points E, F, respectively, $$\theta_1' = \theta_2'$$

will stand in a range where $\theta_1$ and the inclination of tangential plane are both small, owing to quite near distance between points E and F. This means that in an area where the angle subtended by two mask openings at a point at which the optical axis L2 intersects the mat plane 42a is small, the ray of light refracted within a certain range has the same base line for range finding. Further, in the neighborhood of the point E, there are various tangential planes in different directions, and it is conceived from the standpoint of the geometrical optics that the characteristics of diffusion as shown in FIG. 2 can be obtained as their total behavior, with each tangential plane being applicable to the content as described in FIGS. 5A and 5B. Also, in FIGS. 5A and 5B, the point for range finding on the optical axis is drawn, but the point outside of the optical axis can be also considered. Accordingly, it is to be understood that the base length for range finding in the focus detecting device can be determined by the interval between the openings of mask 48, and is not affected by the characteristics of the diffuser plate.

This focus detecting device is capable of detecting the optimal focusing position in accordance with the spatial frequency of the object image, by taking in the light flux of bright F number by virtue of such properties, without increasing the base line for range finding more than needed.

Figure 6A:
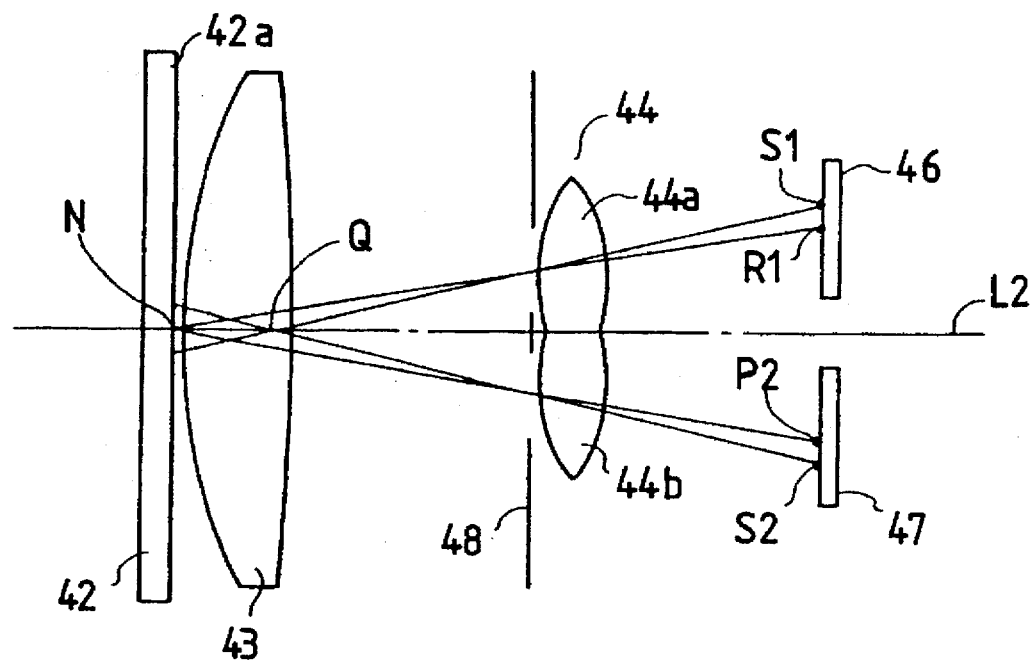
FIGS. 6A and 6B are explanation views showing the relation between the base line for range finding and the amount of image shift.
Figure 6B:
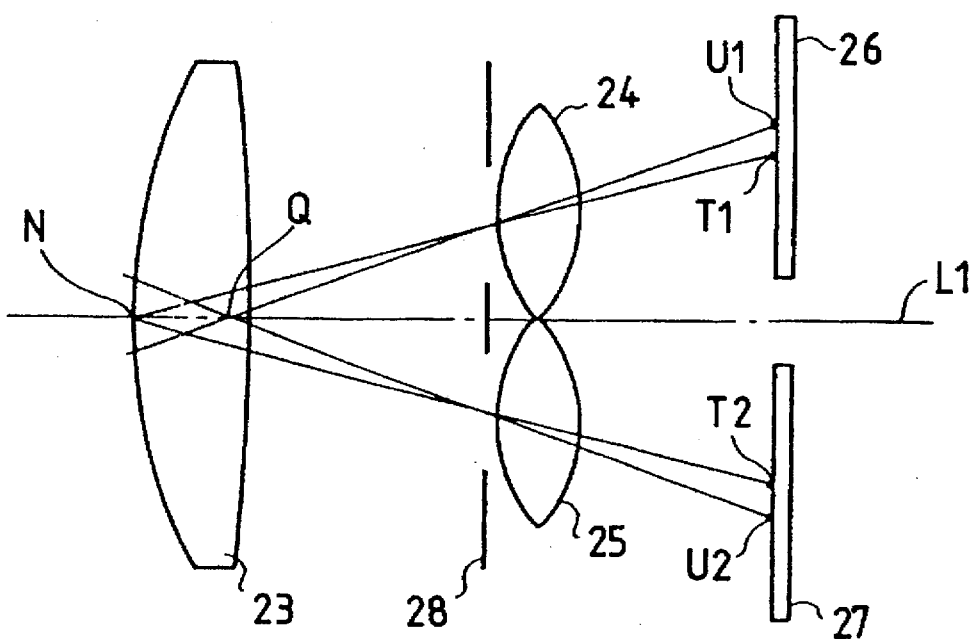
Figure 20:
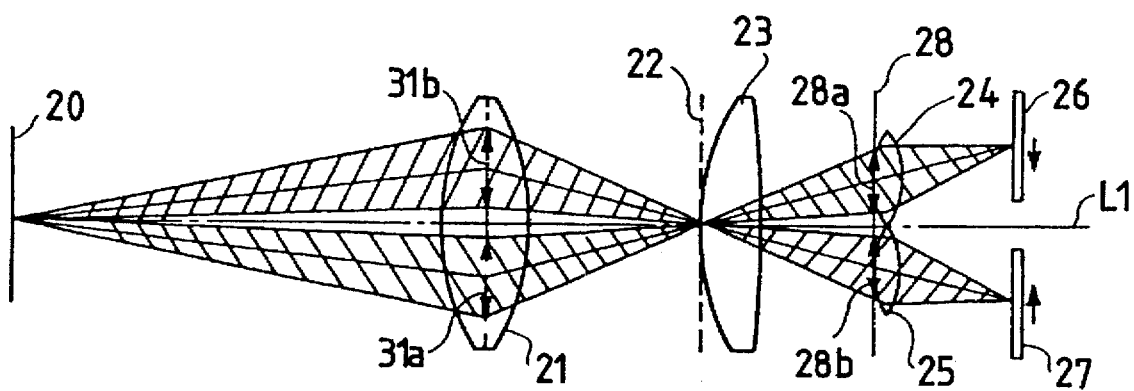
FIG. 20 is a cross-sectional view of a conventional focus detecting device.
Figure 21:
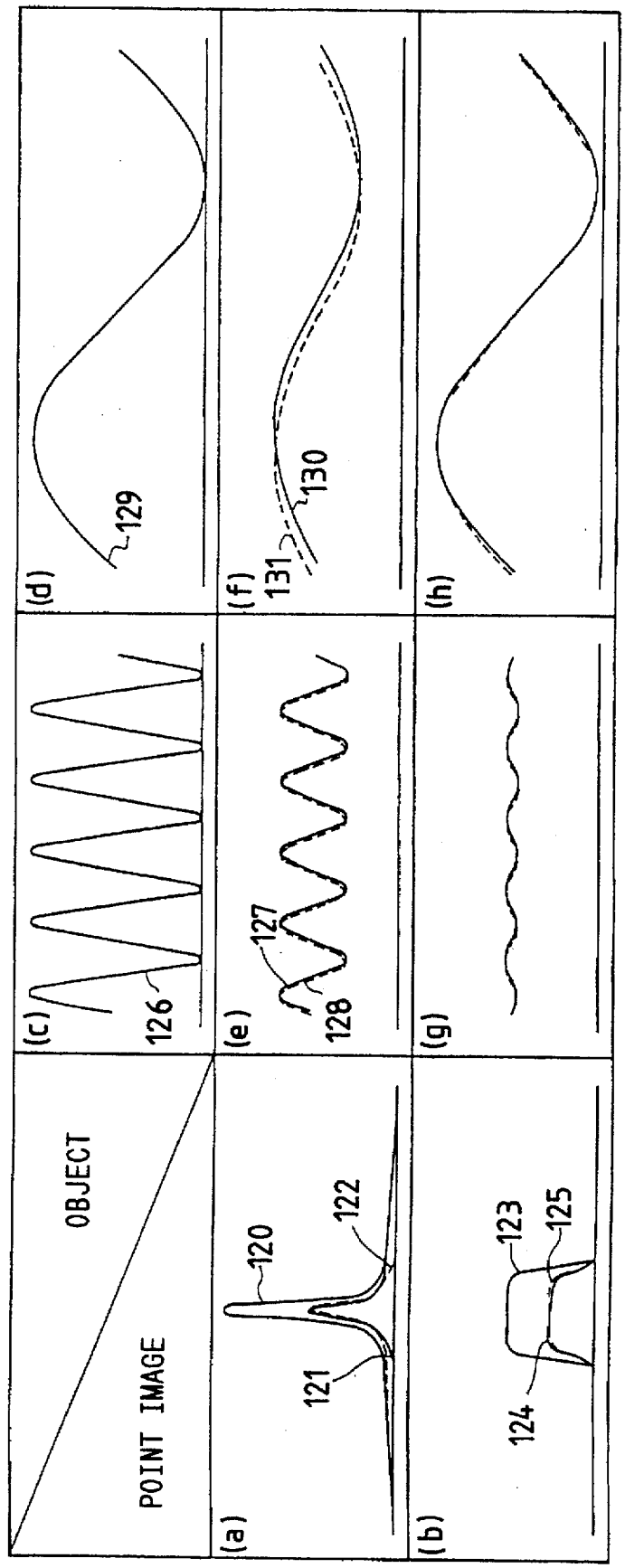
FIGS. 21(a) to (h) are explanation views showing different images in accordance with the intensity distribution of point image and the spatial frequency of object.

The amount of image shift is varied by the difference of the base length for range finding, as previously described, but here, it is described in detail with reference to the drawings. FIG. 6A is a detail view of the focus detecting device in this example as shown in FIG. 1, and FIG. 6B is a detail view of the conventional focus detecting device as shown in FIG. 20. The ray of light as shown is a principal ray of light of the reimaging system passing through a point for range finding on the light axis L1 or L2, which is a light path when either lens is represented with a thin lens system.

First, when an object is imaged at a point N, secondary images of object are projected on R1 and P2 on the array of photoelectric transfer elements in FIG. 6A, or T1 and T2 in FIG. 6B. Next, when the imaging position moves to a point Q because the distance of object is changed, or the taking lens is fed, the projected positions of secondary images transfers to points S1, S2 in FIG. 6A, or U1, U2 in FIG. 6B. By comparison between both image shift movements associated with such a defocus, it will be found that the movement of image as shown in FIG. 6B, which has a larger angle subtended by two mask openings, is greater. Accordingly, to detect the same amount of defocus, that array of photoelectric transfer pixels as shown in FIG. 6B will require a longer length. This is unfavorable on the cost, the space for reserving parts, or the optical design, as previously described.

Figure 7:
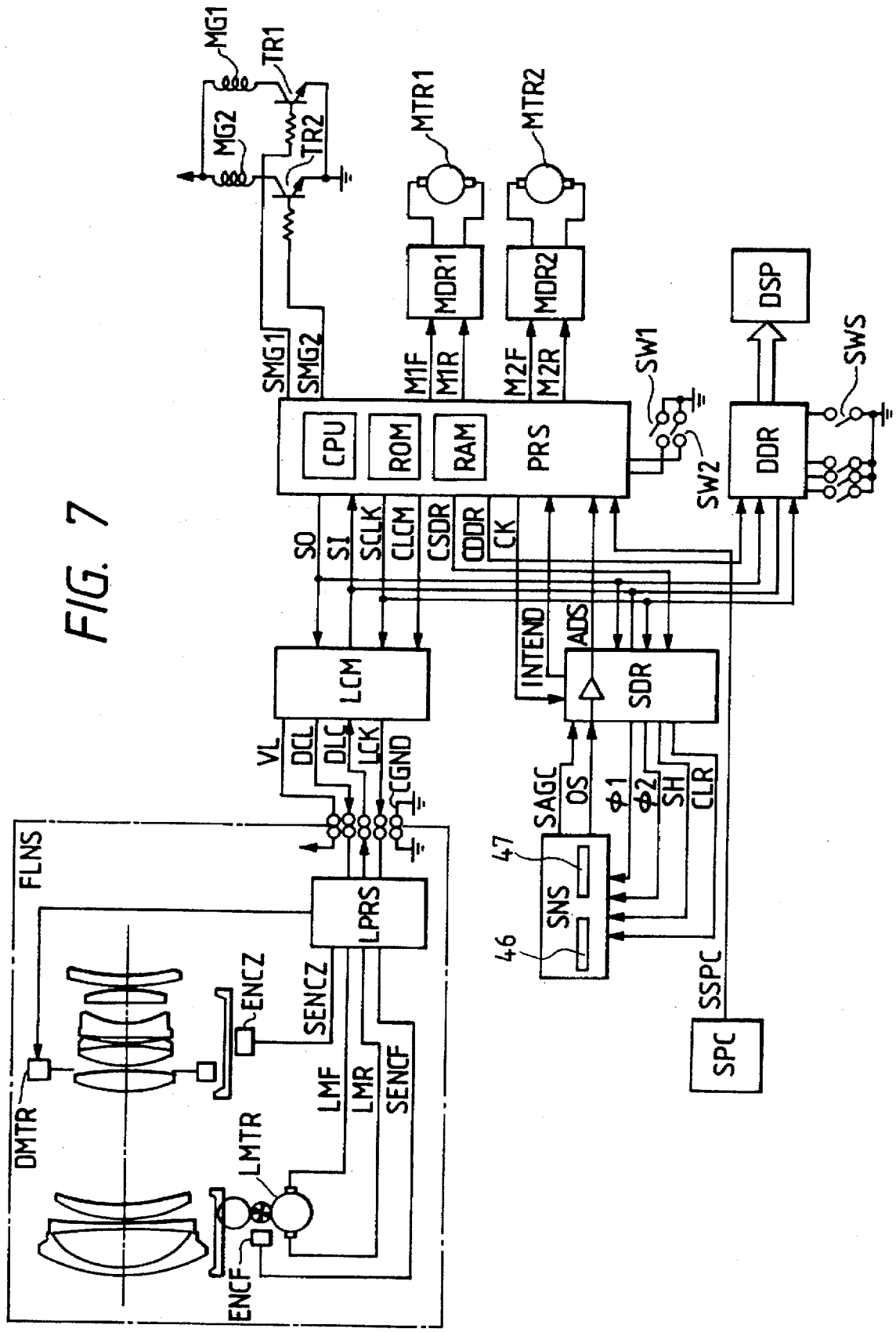
FIG. 7 is a circuit diagram when the focus detecting device of the example is applied to a camera.

FIG. 7 is a circuit diagram when an automatic focusing device according to the present invention is applied to a camera.

In the figure PRS is a control device of the camera, for example, a one-chip microcomputer having internally a CPU (central processing unit), ROM, RAM, and A/D conversion feature. The computer PRS performs a series of operations for camera, such as automatic exposure control function, automatic focus detecting function, or winding-up of film, in accordance with a sequence program of this camera stored in ROM. For the purpose, PRS communicates with peripheral circuits and lenses within a camera main body, using synchronous communication signals SO, SI, and SCLK, and communication select signals CLCM, CSDR, and CDDR, to control the operation of each circuit or lens.

Synchronous communication signal SO is a data signal output from the computer PRS, SI is a data signal input into the computer PRS, and SCLK is a synchronizing clock for the signals SO and SI.

Lens communication buffer circuit LCM links a camera to lens communication buffer when a select signal CLCM from the computer PRS is at a higher potential level (thereafter abbreviated as "H"), as well as supplying the power to a power terminal for lens during the operation of camera.

That is, if the computer PRS sends a predetermined data beginning with SO in synchronization with SCLK, with CLCM being set at "H", LCM sends each buffer signal LCK, DCL for SCLK, SO via a contact point between camera and lens to the lens. At the same time, LCM outputs a buffer signal for signal DCL from the lens as SI, and the computer PRS inputs the SI as above as data from the lens in synchronization with SCLK.

SDR is a driving circuit for a line sensor device SNS for focus detection, consisting of CCD's, and is selected when a signal CSDR is "H" to be controlled from PRS using SO, SI and SCLK.

A signal CK is a clock for generating CCD driving clocks $\phi_1$, $\phi_2$, and a signal INTEND is one informing the computer PRS of the end of accumulation operation.

The output signal OS from a sensor device SNS is an image signal in time series in synchronization with clocks $\phi_1$, $\phi_2$, and output as ADS to the computer PRS after being amplified in an amplifier circuit within the driving circuit SDR. The computer PRS inputs ADS at an analog input terminal, and stored sequentially in predetermined addresses of RAM, after being A/D converted with the A/D conversion feature provided internally in synchronization with CK.

Similarly, a signal SAGC that is an output signal from the sensor device SNS is the output for AGC (Auto Gain Control) sensor within the sensor device SNS, input into the driving circuit SDR and used for image signal accumulation control in the sensor device SNS.

SPC is a exposure control photometry sensor for receiving the light from an object via the taking lens, its output SSPC is input into an analog input terminal of the computer PRS, and used for the automatic exposure control (AE) in accordance with a predetermined program, after A/D conversion.

DDR is a switch detecting and displaying circuit, and is selected when the signal CDDR is "H" to be controlled from the computer PRS, using SO, SI and SCLK. That is, it acts to switch the display on a display member DSP of camera, based on data transmitted from the computer PRS, or notify the computer PRS of the on/off state in various operation members of camera via the communication.

Switches SW1, SW2 are interlocked with a release button, not shown, in which SW1 is turned on by depressing the release button at a first stage, and subsequently SW2 is turned on by depressing it up to a second stage. The computer PRS performs the operations of photometry and automatic focus adjustment, when the SW1 is turned on, and those of exposure control and winding of film when the SW2 is turned on as the trigger, as will be described later. It should be noted that the SW2 is connected to "interrupt input terminal" of the microcomputer PRS, enabling the interruption by the SW2 being turned on even during execution of program with the SW1 on, and the immediate transfer to a predetermined interrupt program.

MTR1 is a film feed motor, and MTR2 is a motor for mirror up/down and shutter spring charge, each of which is controlled for positive or reverse rotation by each of driving circuits MDR1, MDR2. Signals M1F, M1R, M2P, M2R which are input into the driving circuits MDR1, MDR2 from the computer PRS are motor control signals.

MG1, MG2 are magnets for starting the first blind and second blind of shutter, and are energized by signals SMG1, SMG2 with amplification transistors TR1, TR2 and controlled for shutter with the PRS.

It is noted that the switch detecting and displaying circuit DDR, the motor driving circuits MDR1, MDR2, and the shutter control are not directly connected with the present invention, and detailed description will be omitted.

The signal DCL input into a control circuit LPRS within the lens in synchronization with LCK is an instruction data from the camera to the lens FLNS, having predefined operations for the instruction.

The control circuit LPRS analyses the instruction in accordance with a predetermined procedure to perform the focus adjustment or aperture control, or output various parameters of lens (full F number, focal distance, coefficient of amount of defocus to that of feeding, etc.) from the output DCL.

In the example, a zoom lens is shown, in which the focus adjustment is performed in such a way as to move the optical system in a direction of the optical axis by driving a focus adjustment motor LMTR with the signals LMF, LMR when an instruction for focus adjustment is transmitted from the camera, in accordance with the amount and direction of driving transmitted at the same time. The amount of movement for the optical system is counted by a counter within LPRS while monitoring it with a pulse signal SENCF of an encoder circuit ENCF, and when a predetermined movement has been completed, the LPRS itself brakes the motor LMTR by setting the signals LMF, LMR at "L".

Therefore, once the focus adjustment instruction has been transmitted from the camera, no further involvement of the control device PRS is necessary to drive the lens, until the driving of lens has been completed.

Also, when an aperture control instruction is transmitted from the camera, a well-known stepping motor DMTR is driven for driving the aperture in accordance with the number of aperture stages transmitted concurrently. It should be noted that there is no need for an encoder to monitor the operation, because the stepping motor allows open control.

ENCZ is an encoder circuit associated with a zoom optical system, in which the control circuit LPRS within the lens detects the zoom position by inputting a signal SENCZ from the encoder circuit ENCZ. In the control circuit LPRS are stored lens parameters at each zoom position, and when a request is issued from the computer PRS, parameters corresponding to a current zoom position are sent out to the camera.

Figure 8:
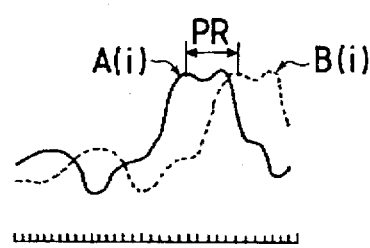
FIG. 8 is a view showing an example of an image signal with a photoelectric transfer element.

FIG. 8 shows an example of photoelectric transfer outputs for two images formed on the arrays of sensors 46, 47. Let the output of SAA to A(i), and that of SAB be B(i). Note that in this example, the number of pixels for the sensor is 40 pixels (i=0, . . ., 39).

A signal processing method for detecting the amount of image shift PR from the image signals A(i) and B(i) is as disclosed in Japanese Laid-Open Patent Application No. 58-142306, Japanese Laid-Open Patent Application No. 59-107313, Japanese Laid-Open Patent Application No. 60-101513, or Japanese Patent Application No. 61-160824.

Figure 9:
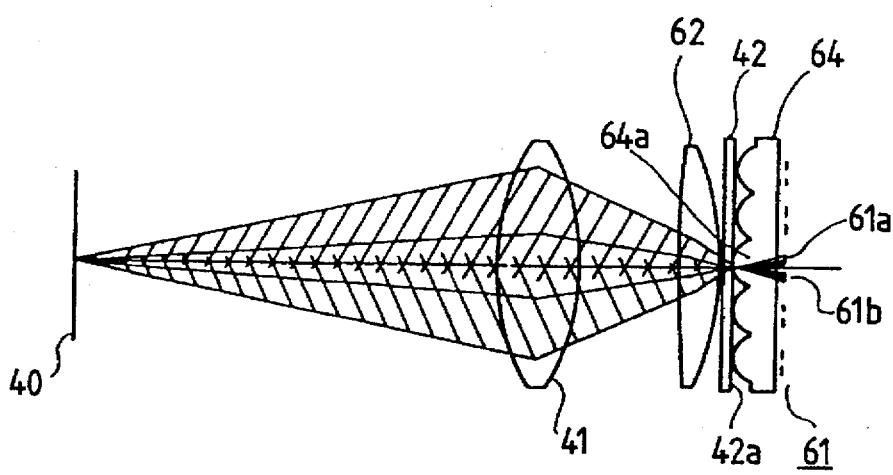
FIG. 9 is a cross-sectional view showing a second example of a focus detecting device.
Figure 10:
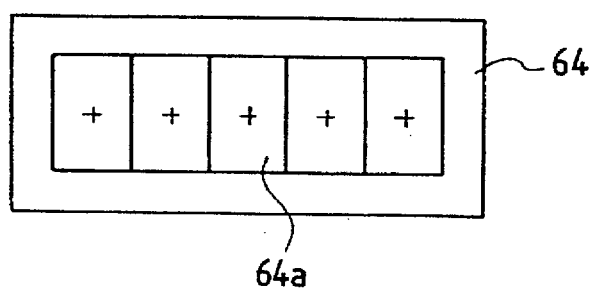
FIG. 10 is a plan view of an array of minute lenses for use with the focus detecting device as shown in FIG. 9.
Figure 11:
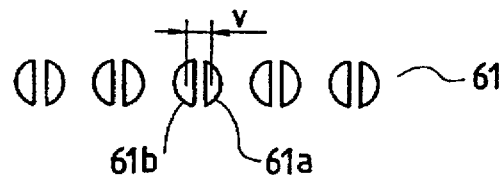
FIG. 11 is a plan view of photoelectric transfer elements.

FIG. 9 shows a second example according to the present invention in a cross-section-of the focus detecting device. In the figure, the same numerals are attached to the same elements as in the first example. In the figure, 62 is a field lens, 64 is an array of minute positive lenses, and 61 is photoelectric transfer elements each having a pair of pixels 61a, 61b for each lens. The object light transmitted through a taking lens 41 is first incident on the field lens 62, and subsequently, incident on a diffuser plate 42a placed behind. A mat plane 42a on the diffuser plate 42 is set in the neighborhood of a predetermined imaging plane of the taking lens 41, as in the first example, where an object image is formed thereon at the focusing of the taking lens 41. The mat plane 42a has the characteristics of diffusion as shown in FIG. 2, the light transmitted therethrough being incident on the array of minute lenses 64. This array of minute lenses 64 has the action of projecting a pair of pixels placed behind each minute lens on to the same position on an exit pupil of taking lens, as well as the field lens 62. FIGS. 10 and 11 are plan views showing the array of minute lenses and the photoelectric transfer elements, in which + indicates an optical axis. For example, if the pixels 61a, 61b are projected reversely, its image is formed on the exit pupil through the minute lenses 64a, the diffuser plate 42, and the field lens 62, producing bled image due to the action of the mat plane 42a, as in the first example. Also, for other pairs of pixels, their images are projected overlapped on the images of pixels 61a, 61b, and for each pair of pixels, an exit pupil area passed by the light flux entering the right-hand pixel passes and an exit pupil area passed by the light flux entering the left-hand pixel passes are formed respectively. Accordingly, if the output only on one side for each pair of pixels is taken out, the output of image from the light flux passing through a specified area of the taking lens can be obtained, with each lens portion in the array of minute lenses being made an opening for sampling the image. If the relative positional relation between these two image signals is detected, the focusing position of the taking lens can be known.

By the way, in the focus detecting device with the above constitution, a factor for determining the base length for range finding is the interval V between pixel gravitational centers for a pair of pixels as shown in FIG. 11. As this focus detecting device receives the light passing through the diffuser plate, it is possible to use the light flux passing through a wide area on the exit pupil for the range finding, in a state of setting a small interval V between pixel gravitational centers. Accordingly, since the focusing position appropriate for the spatial frequency of image can be detected, and the amount of image shift along with the defocus is small, it is not necessary to set the array of photoelectric transfer elements to be long.

In the first and second examples as above described, examples of diffusing the light flux for range finding with a mat plane consisting of continuous minute irregularities are shown, but a phase-type diffuser plate may be used as light diffusing means. The phase-type diffuser plate has many patterns of predetermined shapes consisting of minute irregularities formed on an optically transparent substrate surface, and is provided with a desired characteristic of diffusion by giving the phase difference in area to the light flux passing therethrough.

Particularly, by arranging regularly a plurality unit pattern areas on an optically transparent substrate, each of unit pattern being formed by arranging plural minute patterns of predetermined shapes consisting of convex and/or concave portions made of the same material as that of the substrate, irregularly in the positions and sizes, the color aberration under the influence of diffraction of light can be avoided, or diffracted light intensity from zeroth to higher order is prevented from having discrete strong peaks.

Figure 12:
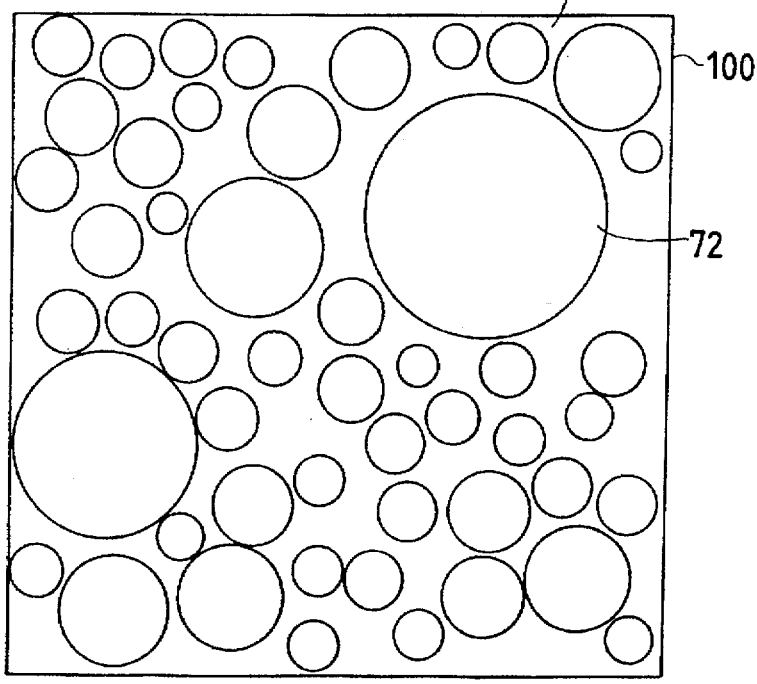
FIG. 12 is a plan view of a diffuser plate in a third example of a focus detecting device.

FIG. 12 is a plan view showing a part of unit pattern area 100 constituting the phase-type diffuser plate.

A phase-type focusing screen 42 to be used as a specific example is made in the die pressing process for plastic material from an original in which a plurality of rectangular unit pattern area are arranged regularly in two dimensions as shown in FIG. 12.

Accordingly, 71 is the optically transparent substrate, 72 is circular minute patterns consisting of convex or concave portions, made of the same material as that of the substrate 71.

That is, plural circular minute patterns 72 consisting of convex or concave portions are formed on the substrate 71 in various sizes and depths irregularly by a pattern forming device using a computer so as to constitute unit patterns.

And a predetermined phase difference is given between the light flux passing through convex portions and that not passing therethrough, i.e., the light scattering is caused to a predetermined degree, whereby the phase diffuser plate of area type having a desired characteristic of diffusion is obtained.

Providing that a focusing screen used in this example has a rectangular unit structure having a size of 100 μm×100 μm, and including minute patterns of circular shapes inside thereof, it is preferable to have about 2000 units for a radius r of the circle of about 1 μm, and about 20 units for a radius r of about 8 μm.

In the example as shown in FIG. 12, in a rectangular unit pattern area are provided a plurality of circular minute patterns having irregular positions and sizes (radii).

It should be noted that in this example, the shape of minute pattern is not limited to a circle, but can be of any shape such as rectangle, triangle, ellipse, etc. It should be also noted that the maximum circular minute pattern contained in the unit pattern area in this example has a diameter of 14 μm, and when the phase-type focusing screen is made of acrylic (N=1.49) with a desired wave-length λ=550 nm, the height Δ of the circle minute pattern is set as $$\Delta = \lambda 2(N-1) = 0.56 \text{ μm}$$

Figure 13:
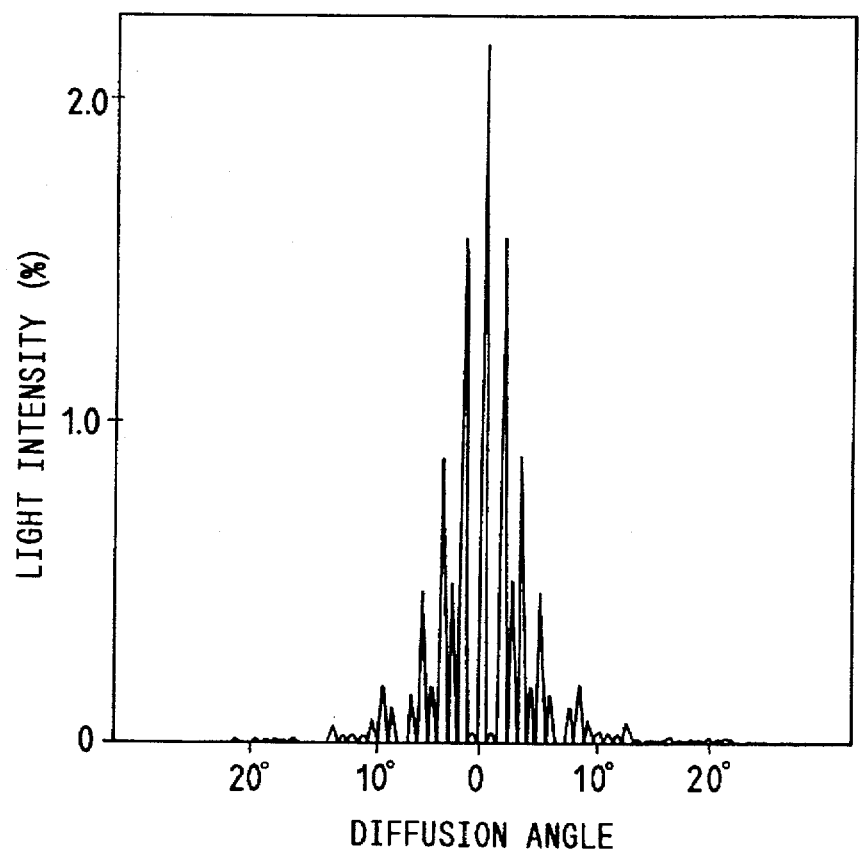
FIG. 13 is a view showing the characteristics of diffusion in the diffuser plate as shown in FIG. 12.

FIG. 13 is one example of the diffusion characteristic distribution for the phase-type diffuser plate, with its longitudinal axis being the intensity of light when the total quantity of emergent light is 100%, and the transversal axis being the diffusion angle. A strong peak is provided at 0°. Such diffuser plate has advantages that the diffusibility can be easily controlled, and the metal mold for use with the molding can be relatively easily fabricated.

Figure 14:
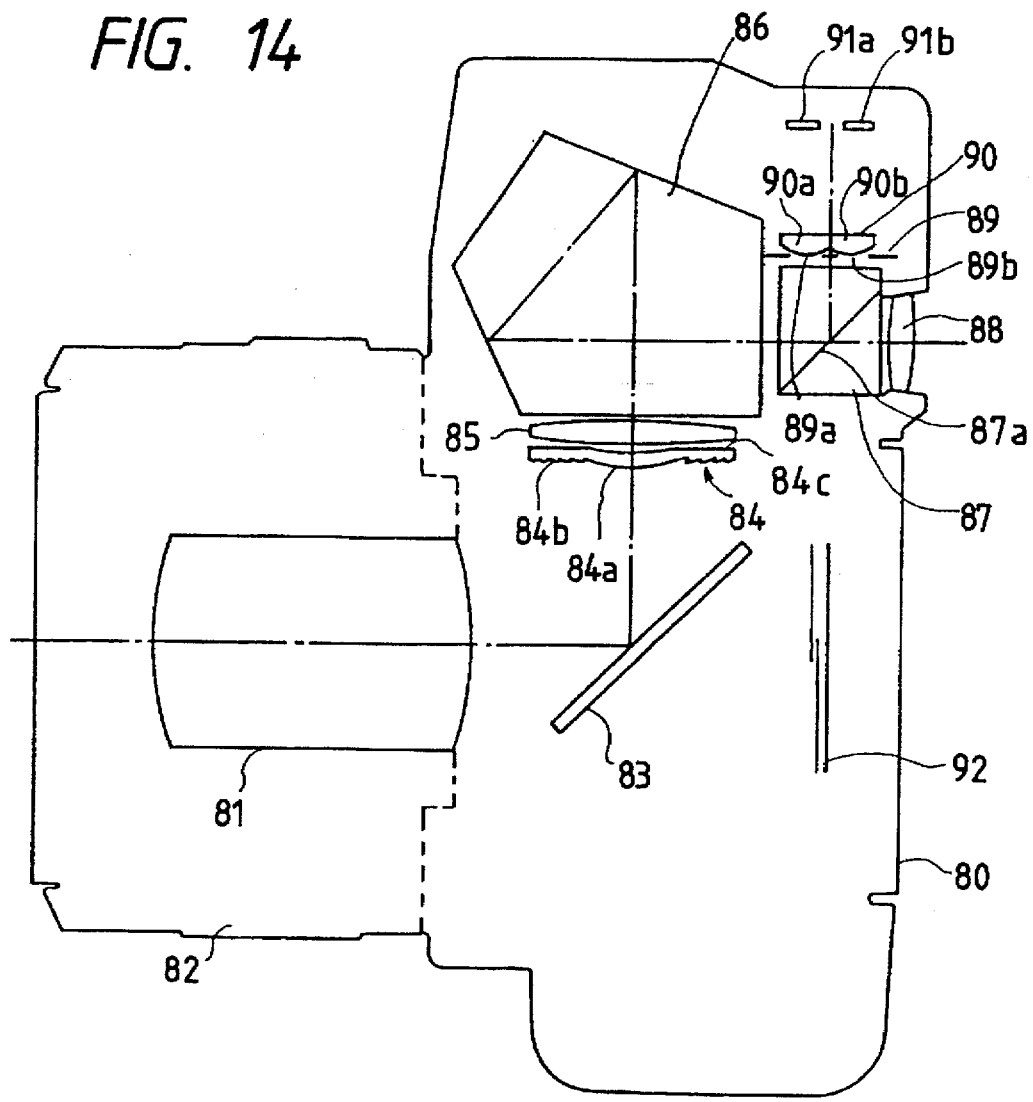
FIG. 14 is a cross-sectional view of a single lens reflex camera representing a state where a focusing screen of single lens reflex camera is commonly used as the diffuser plate of focus detecting device.

FIG. 14 is an example in which the focus detecting device as above described is incorporated into a single lens reflex camera, having the diffuser plate of focus detecting device being also used for the focusing screen. In the figure, 80 is a single lens reflex camera body, 82 is a lens barrel for holding the lens 81 movable in its optical axis direction which is secured to the camera body 80, or detachable therefrom, and 83 is a movable mirror. The movable mirror 83 is placed in a down state when an object image is observed so as to deflect the light flux from the taking lens upward and lead it to a finder and focus detecting system, and lifted up immediately before start of exposure for a photo film 92, and returned to the shown state upon termination of exposure.

The above finder and focus detecting system is composed of the following components. In the figure, 84 is a focusing screen for diffusing the light flux for range finding, as well as forming in a state in which the object image can be visualized, 85 is a condenser lens (field lens), 86 is a penta roof prism, 87 is a beam splitter for splitting the light flux to the focus detecting device, and 88 is an eye-lens. On a plane of light incidence on the focusing screen 84 is formed a spherical portion 84a for causing the light flux for range finding to be incident upon a mat plane 84c almost at right angle, and a Fresnel lens on the periphery out of the field for range finding. Also, the mat plane 84c is formed to be slightly concave on a portion corresponding to the spherical portion 84a, in order to correct for the curvature of predetermined imaging plane due to the spherical portion 84a. The ray of light diffused at the mat plane 84c is directed toward the eye-lens 88 by the condenser lens disposed behind to reach an observer.

Figure 15:
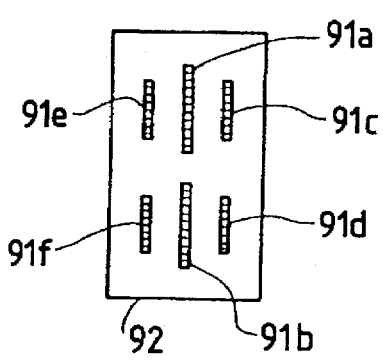
FIG. 15 is a plan view of photoelectric transfer elements for use with the focus detecting device as shown in FIG. 14.
Figure 16:
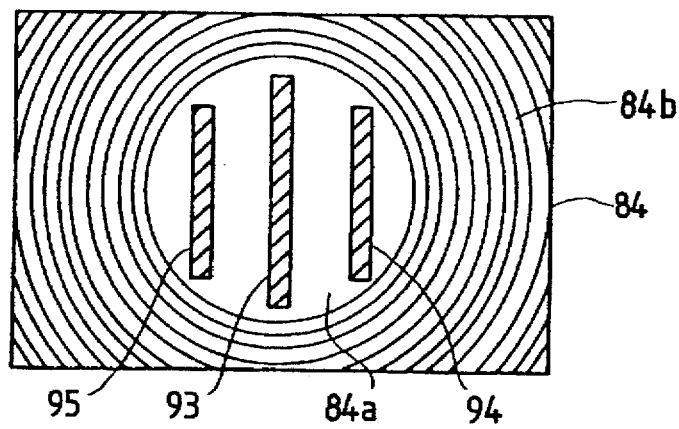
FIG. 16 is an explanation view showing the field of view for range finding on the focusing screen.
Figure 17:
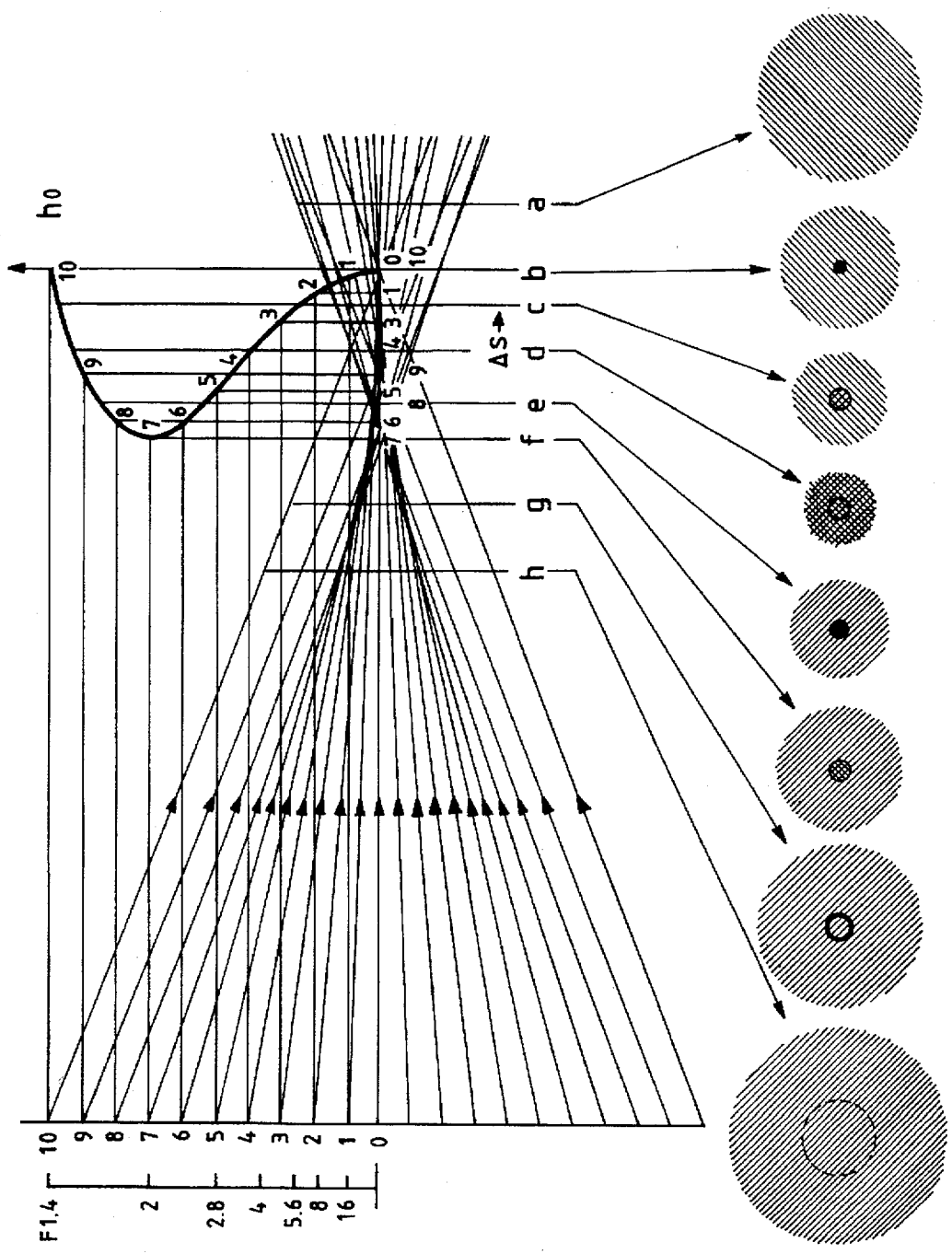
FIG. 17 is a view for explaining the spherical aberration of taking lens and the states of point image.
Figure 18:
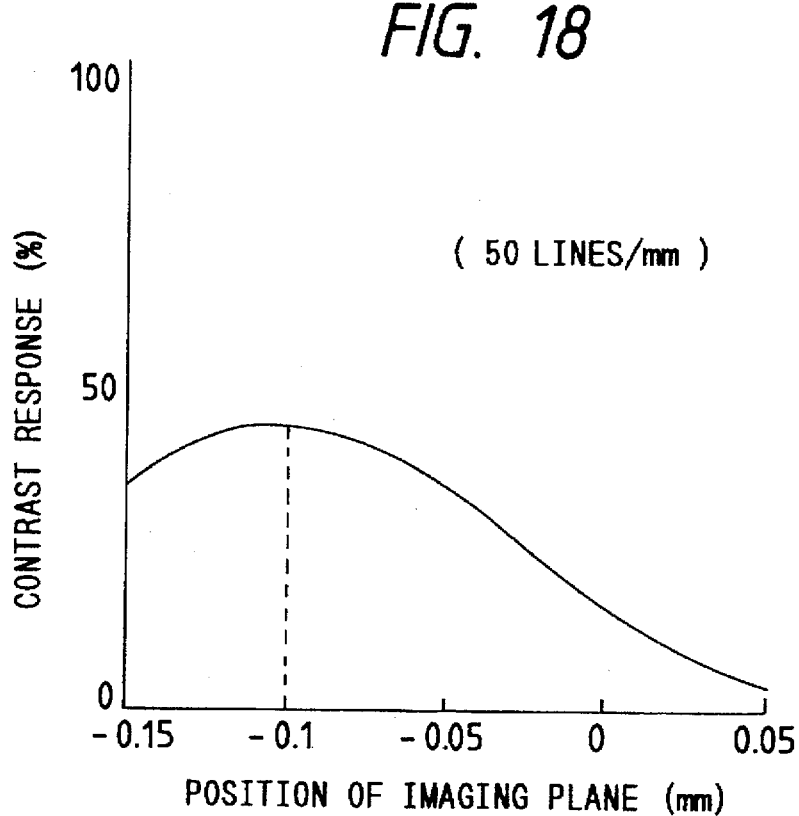
FIGS. 18 and 19 are views showing the defocus characteristics for MTF.
Figure 19:
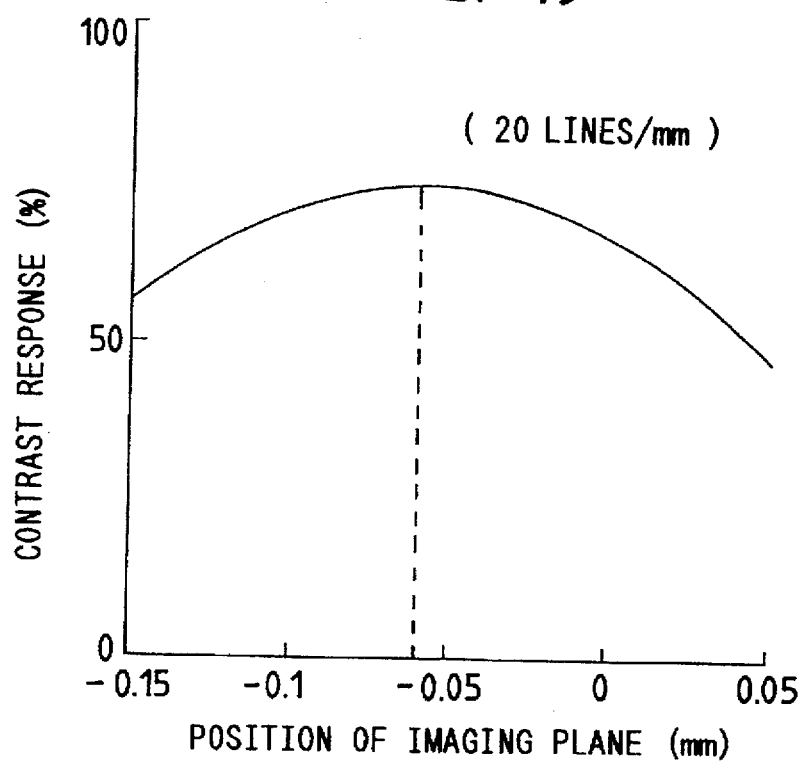

The light flux reflected upward at a half mirror 87a of beam splitter is used for the focus detection. In the figure, 89 is a mask having two openings 89a, 89b, 90 is a secondary imaging lens consisting of two lens portions 90a, 90b corresponding to the openings of mask, and 91a, 91b are arrays of photoelectric transfer elements consisting of many pixels. The spherical portion 84a of focusing screen and the condenser lens 85 project the mask 89 on to the exit pupil of the taking lens 81, and the secondary imaging lens 90 projects the mat plane 84c of focusing screen on to the array of photoelectric transfer elements. At this time, due to the diffusing action of the mat plane 84c, a projected image of mask is bled so as to have some broadening, like in the previous example. Also, the array of photoelectric transfer elements on to which secondary images of object are projected has optically a degree of freedom in layout in a directing perpendicular to the face of paper of FIG. 14, and for example, if three pairs of arrays of elements are provided, they can be operated as the field for range finding for each of three lines. FIG. 15 is a plan view showing such photoelectric transfer elements. In the figure, 92 is a sensor chip, 91a, 91b are an array of photoelectric transfer elements as represented in FIG. 14, and 91c, 91d and 91e, 91f are-arrays of photoelectric transfer elements positioned before and behind the paper face of FIG. 14, respectively. FIG. 16 shows the area where the use of those arrays of photoelectric transfer elements enables the focus detection, drawing reverse projection images of the array of photoelectric transfer elements formed on the focusing screen 84. These reverse projection images correspond to the field for range finding. In the figure, 93, 94, 95 are the fields for range finding, and the field for range finding 93 is one in which reverse projection images of the array of elements 91a, 91b are superimposed. Similarly, the field for range finding 94 corresponds to the array of elements 91c, 91d, and the field for range finding 95 corresponds to the array of elements 91e, 91f, respectively. Since this focusing screen has a Fresnel lens portion, as previously described, these fields for range finding are located on the spherical portion 84a provided inside of the Fresnel lens 84b so that step portion of adjacent Fresnels may not exert a bad influence on the focus detection.

With the above constitution, it is possible to visualize the focusing state of object image, because there is some diffusibility in the field position for range finding on the focusing screen, even if the focus detecting device is disposed in a finder system of single lens reflex camera. Further, unlike the constitution for conducting the light flux of range finding to the focus detecting device on the bottom portion of a mirror box, using a submirror which has been generally used conventionally, it is possible to enlarge the field for range finding to a wider area of finder field, because there is no restriction on the received light flux due to the dimension of submirror. Especially, the vertical or particularly downward enlargement of the field for range finding, which has been impossible with the above conventional method, can be fulfilled in the form as shown in FIG. 16, so that significantly large effects can be provided in the meaning of increasing the degree of freedom in photographing.

It should be noted that in the above example, the diffuser plate is of transparent type, but a predetermined diffusion structure can be added on the reflection surface.

According to the present invention as above described,

1) The best imaging position of the taking lens can be detected in accordance with the spatial frequency of object image, and a large range of the unfocused condition can be detected without increasing the length of the array of photoelectric transfer elements.

2) If the focusing screen of single lens reflex camera and the diffuser plate of focusing detection device are commonly used, it is possible to dispose the focus detecting device without the needs of submirror and its driving mechanism. Furthermore, there is some light diffusibility in the field position for range finding on the focusing screen, so that the visibility of object image can not be lost.

3) As there is also no restriction on the received light flux with the submirror, it is possible to extend the field for range finding in a lower direction from the finder field.

I claim:

1. A focus detecting device comprising:

light distribution forming means for forming light intensity distributions whose relative positions are varied in accordance with a focus adjustment of an objective lens from light flux passing through the objective lens;

sensing means having a plurality of sensing elements, said sensing means receiving the light intensity distributions from said light distribution forming means and outputting a signal representing the state of focus adjustment for the objective lens based on the relative positions of the light intensity distributions on said sensing means; and light diffusing means disposed in or near a predetermined imaging plane of said objective lens and on a light path between said objective lens and said sensing means, and having a degree of light diffusion determined so that the positions of the light intensity distributions vary in accordance with the focus adjustment state of said objective lens.

2. The focus detecting device according to claim 1, further comprising a field lens with a positive refractive index arranged in proximity of said light diffusing means.

3. The focus detecting device according to claim 1, wherein said light diffusing means comprises a plastic plate die pressed thereon.

4. The focus detecting device according to claim 1, wherein said light diffusing means comprises a transparent optical element on a surface of which many convex or concave minute portions of predetermined shapes are provided.

5. A camera apparatus comprising:

a reflector for reflecting or passing selectively the light flux from an object lens;

a field lens disposed on a reflecting optical path with said reflector;

a secondary imaging lens assembly for forming a light intensity distribution whose relative position varies in accordance with the focus adjustment of said object lens from the light flux passing through said field lens;

a sensing device for receiving the light intensity distribution and outputting a signal representing the state of focus adjustment of said object lens based on the relative position in the light intensity distribution, and having a plurality of sensing elements;

a focusing screen disposed near said field lens and on the reflecting optical path between said object lens and said secondary imaging lens assembly, and having the degree of light diffusion determined so that said light intensity distribution can be moved relatively in accordance with the adjustment of said object lens; and a viewer for observing an object image formed on said focusing screen.

6. The camera apparatus according to claim 5, wherein said focusing screen comprises a die passed transparent raw material.

7. The camera apparatus according to claim 6, wherein said focusing screen is disposed having minute convex or concave portions on its surface which determine the light diffusion to a predetermined degree.

* * * * *

UNITED STATES PATENT AND TRADEMARK OFFICE
CERTIFICATE OF CORRECTION

PATENT NO. : 5,678,097
DATED : October 14, 1997
INVENTOR(S) : YASUO SUDA

It is certified that error appears in the above-identified patent and that said Letters Patent is hereby corrected as shown below:

COLUMN 1:

Line 38, "to" should read --to the out-of-focus amount from the predetermined imaging plane--;
   Line 39, "the out-of-focus amount from the predeter-" should be deleted; and
   Line 40, "mined imaging plane" should be deleted.

COLUMN 4:

Line 27, "convoluing" should read --comparing--; and
   Line 34, "owinig" should read --owing--.

COLUMN 5:

Line 65, "of the" should be deleted; and
   Line 66, "of object" should read --of the object--.

UNITED STATES PATENT AND TRADEMARK OFFICE
CERTIFICATE OF CORRECTION

PATENT NO. : 5,678,097
DATED : October 14, 1997
INVENTOR(S) : YASUO SUDA

It is certified that error appears in the above-identified patent and that said Letters Patent is hereby corrected as shown below:

COLUMN 8:

Line 7, "$\theta_1, \theta_2,$" should read --$\theta'_1, \theta'_2,$--.

COLUMN 9:

Line 6, "the" should read --this--.

COLUMN 11:

Line 5, "cross-section-of" should read --cross section of--;
Line 66, "plurality unit" should read --plurality of unit--; and
Line 67, "of" should be deleted.

COLUMN 12:

Line 38, "shape of" should read --shape of the--.

UNITED STATES PATENT AND TRADEMARK OFFICE
CERTIFICATE OF CORRECTION

PATENT NO. : 5,678,097
DATED : October 14, 1997
INVENTOR(S) : YASUO SUDA

It is certified that error appears in the above-identified patent and that said Letters Patent is hereby corrected as shown below:

COLUMN 13:

Line 38, "directing" should read --direction--; and
Line 45, "are-arrays" should read --are arrays--.

Signed and Sealed this

Tenth Day of August, 1999

Q. TODD DICKINSON

*Attest:*

*Attesting Officer*     Acting Commissioner of Patents and Trademarks